United States Patent
Enström et al.

(10) Patent No.: US 9,161,286 B2
(45) Date of Patent: Oct. 13, 2015

(54) METHOD AND ARRANGEMENT FOR SESSION NEGOTIATION

(75) Inventors: Daniel Enström, Gammelstad (SE); Tomas Frankkila, Luleå (SE); Stefan Bruhn, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 278 days.

(21) Appl. No.: 13/263,094

(22) PCT Filed: Apr. 6, 2010

(86) PCT No.: PCT/SE2010/050378
§ 371 (c)(1),
(2), (4) Date: Nov. 15, 2011

(87) PCT Pub. No.: WO2010/117326
PCT Pub. Date: Oct. 14, 2010

(65) Prior Publication Data
US 2012/0106451 A1    May 3, 2012

Related U.S. Application Data

(60) Provisional application No. 61/167,304, filed on Apr. 7, 2009.

(51) Int. Cl.
*H04W 4/00* (2009.01)
*H04W 36/38* (2009.01)

(52) U.S. Cl.
CPC .................. *H04W 36/385* (2013.01)

(58) Field of Classification Search
CPC ...................................... H04W 4/00
USPC ................ 370/232–234, 352–356, 465–473, 370/389–427, 516–545; 709/218, 231–232
See application file for complete search history.

(56) References Cited

U.S. PATENT DOCUMENTS 7,031,703 B1 * 4/2006 Graf et al. .................. 455/432.1
7,756,108 B2 * 7/2010 Curcio et al. ................. 370/352
(Continued)

FOREIGN PATENT DOCUMENTS

EP    1565010 A1    8/2005
JP    2008273193 A    11/2008
WO    2007059201 A2    5/2007

OTHER PUBLICATIONS

Handley, M. et al. "SDP: Session Description Protocol." IEFT Network Working Group; Request for Comments: 4566; Obsoletes: 237, 3266; Category: Standards Track; Jul. 2006.
(Continued)

*Primary Examiner* — Iqbal Zaidi
(74) *Attorney, Agent, or Firm* — Coats & Bennett, P.L.L.C.

(57) ABSTRACT

In a method of improved session negotiation between first and second clients in a cellular telecommunication system, the two clients negotiating S10 and agreeing upon a first codec type for a session. The first and second clients then initiating the session and exchanging S20 media data frames according to the first codec type. Subsequently, during the initiated session, at least one of the first and second clients providing S30 an indication for a second codec type in at least one subsequent media data frame. Finally, upon receiving and recognizing said indication, the other of said first and second clients switching S40 to the indicated second codec type in a next media data frame, thereby enabling the first and second clients to exchange subsequent media frames utilizing the second codec type.

19 Claims, 8 Drawing Sheets

(56) References Cited

U.S. PATENT DOCUMENTS

| | | | |
|---|---|---|---|
| 2005/0174993 | A1 | 8/2005 | Gass |
| 2006/0095590 | A1* | 5/2006 | Miller ............................ 709/246 |
| 2006/0153102 | A1* | 7/2006 | Kuure et al. .................. 370/263 |
| 2007/0011277 | A1* | 1/2007 | Neff et al. ...................... 709/218 |
| 2008/0080694 | A1 | 4/2008 | Usuba et al. |
| 2009/0003436 | A1* | 1/2009 | Levin et al. .............. 375/240.02 |

OTHER PUBLICATIONS

Schulzrinne, H. et al. "RTP: A Transport Protocol for Real-Time Applications." IETF Network Working Group; Request for Comments: 3550; Obsoletes: 1889; Category: Standards Track; Jul. 2003.

Sjoberg, J. et al. "RTP Payload Format and File Storage Format for the Adaptive Multi-Rate (AMR) and Adaptive Multi-Rate Wideband (AMR-WB) Audio Codecs." IETF Network Working Group; Request for Comments: 4867; Obsoletes: 3267; Category: Standards Track; Apr. 2007.

3rd Generation Partnership Project. "Reply LS on Optimised Voice Scheduling in LTE." 3GPP TSG-RAN WG2-57, R2-070868, St. Louis, MO, USA, Feb. 12-16, 2007.

3rd Generation Partnership Project. S4-090882, Draft 3GPP TR22.813, V0.9.5 (Nov. 2008). 3rd Generation Partnership Project; Technical Specification Group Services and System Aspects; Study of Use Cases and Requirements for Enhanced Voice Codecs for the Evolved Packet System (EPS) (Release 9). Nov. 2008.

3rd Generation Partnership Project. 3GPP TS 26.101, V8.0.0 (Dec. 2008). 3rd Generation Partnership Project; Technical Specification Group Services and System Aspects; Mandatory speech codec speech processing functions; Adaptive Multi-Rate (AMR) speech codec frame structure (Release 8). Dec. 2008.

3rd Generation Partnership Project. 3GPP TS 26.114, V8.2.1 (Mar. 2009). 3rd Generation Partnership Project; Technical Specification Group Services and System Aspects; IP Multimedia Subsystem (IMS); Multimedia Telephony; Media handling and interaction (Release 8). Mar. 2009.

3rd Generation Partnership Project, "Technical Specification Group Services and System Aspects; Speech codec speech processing functions; Adaptive Multi-Rate-Wideband (AMR-WB) speech codec; Frame structure (Release 8)", 3GPP TS 26.201 V8.0.0, Dec. 2008, pp. 1-23.

\* cited by examiner

| 0 1 2 3 4 5 6 7 | 0 1 2 3 4 5 6 7 | 0 1 2 3 4 5 6 7 | 0 1 2 3 4 5 6 7 |
|---|---|---|---|
| V \| P \| CC \|M\| PT | Sequence number | | |
| Timestamp | | | |
| SSRC | | | |
| CMR \|F\| FT \|Q\| d(0)... | d(243) \|P\|P | | |

Fig. 1

METHOD AND ARRANGEMENT FOR SESSION NEGOTIATION

TECHNICAL FIELD

The present invention relates to cellular speech session in general and specifically to negotiation of media formats for such sessions.

BACKGROUND

3GPP specifies AMR and AMR-WB as mandatory speech codecs for voice services in 3G networks. These codecs are also mandatory for the 3GPP VoIP service that is specified within the 3GPP multimedia telephony via IMS. The ruling specification for the media handling and interaction is 3GPP TS 26.114. Despite the mandatory status of these codecs, there is presently the desire within 3GPP to specify new voice codecs that will enable even higher service quality than what is possible with AMR-WB.

However, introducing a new speech codec into a speech communications system may be problematic in some respects. One problem is that there is always an installed base of legacy equipment (both terminals and network infrastructure) that does only support the existing 3GPP codecs or just one of them, for instance AMR-WB, rather than the new codec. This may lead to interoperability problems in which communication between new and legacy equipment is not possible unless proper mechanisms are implemented in the system. Traditional ways to address this problem is the provisioning of transcoders in e.g. media gateways that translate between the new and the old coding formats, or the provisioning of the legacy codecs besides the new codec in new terminals that allows choosing the legacy coding format when a connection to a legacy terminal is established. This latter method requires that there is a capability exchange between the terminals prior to the actual speech connection that identifies the common codec that both terminals support. Within the IMS the session description protocol (SDP) IETF RFC 4566 is used to carry out this capability exchange.

The above described ways for ensuring interoperability when introducing a new codec into a communication system are though not the only possibilities and have various disadvantages. The provisioning of transcoders means additional equipment that raises the network investment and maintenance costs. Transcoding is also associated with undesirable speech quality degradations. Using the capability exchange between the terminals prior to the call is a very elegant way, which however may not always be possible. Examples where this is not always possible are multi-party conferencing, hand-over scenarios with mobile users roaming to cells without MTSI support, voice messaging. Also from a terminal implementation point of view, it may be undesirable to provide support for the complete set of new and legacy codecs as this may increase implementation and technology licensing costs.

Hence, in order to avoid the aforementioned problems a preferable solution is that the new codec is embedded bitstream interoperable with (at least) one of the legacy codecs. While this kind of bitstream "embeddedness" on codec level is a necessary condition for interoperability there are further aspects that need to be fulfilled in order to achieve interoperability on system level. Two further essential aspects are SDP signaling compatibility and compatibility of the bitstream transport formats. With respect to the SDP capability negotiation it is desirable that this can be done between new and legacy devices in a transparent way meaning that the legacy device that is unaware of the new codec still can establish a speech service session with the new device.

The transport format to be used for the speech bitstream data in case of 3GPP MTSI follows the IETF specification for the transport protocol for real-time applications (RTP) IETF RFC 3550 and the speech codec specific speech payload format specification, which in case of AMR and AMR-WB is IETF RFC 4867. Obviously, the legacy terminal relies on that specific speech payload format and it would not be able to create or properly receive a speech bitstream according to another (new) format.

Due to the above discussed problems and requirements; there is a need for enabling session negotiation between new and legacy devices in a transparent manner.

SUMMARY

The present invention provides a method for enabling negotiating a new codec type during an ongoing session, to enable reusing existing session negotiating procedures.

Basically, a method of improved session negotiation between first and second clients in a cellular telecommunication system, includes the following steps. In a first instance, the two clients negotiating S10 and agree upon a first codec type for a session. The session is then initiated and media data frames according to the first codec type are exchanged S20 between the two clients. Subsequently, during the session, at least one of the first and second clients provide S30 an indication for a second codec type in at least one subsequent media data frame. Finally, upon receiving and recognizing the provided indication, the other of the first and second clients switches S40 to the indicated second codec type in a next media data frame, thereby enabling the two clients to exchange subsequent media frames utilizing the second codec type.

According to a further aspect of the present invention, a client in a cellular telecommunication system includes means for negotiating 10 and agreeing upon a first codec type for a session with another client, means for initiating the session and exchanging 20 media data frames according to the first codec type. In addition, the client is provided with means for, during the initiated session, providing 30 an indication for a second codec type in at least one subsequent media data frame. Finally, the client includes means for, upon receiving and recognizing a corresponding indication, switching 40 to the indicated second codec type in a next media data frame, thereby enabling the first and second clients to exchange subsequent media frames utilizing the second codec type.

Advantages of the present invention include:

The benefit of using the two-phase approach for session negotiation according to the present invention is because of the backward compatibility expressed on the SIP/SDP signaling plane. It looks like an ordinary AMR-WB session but the CMR signaling "probes" for the possibility to use the new speech codec instead. The nature of the CMR bits makes this backward compatible since a legacy decoder will automatically dismiss a CMR request or a received frame with a "new" FT, if it does not understand it.

BRIEF DESCRIPTION OF THE DRAWINGS

The invention, together with further objects and advantages thereof, may best be understood by referring to the following description taken together with the accompanying drawings, in which:

FIG. 1 illustrates a known RTP payload format.

ABBREVIATIONS

Figure 2:
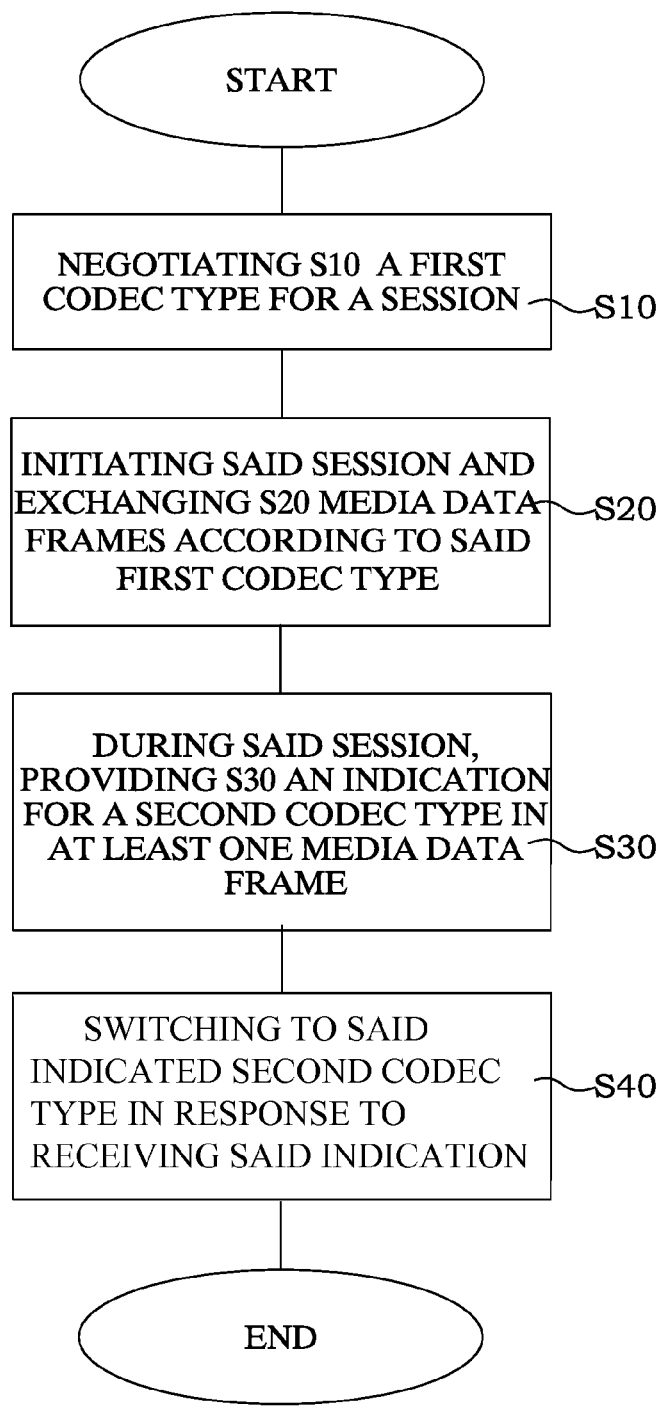
FIG. 2 illustrates the signaling of an embodiment of the present invention.

3GPP 3d Generation Partnership Project
AMR Adaptive Multi Rate
AMR-WB AMR-Wide Band
CMR Codec Mode Request
EVS Enhanced Voice Service
IMS IP Multimedia Subsystem
MTSI Multimedia Telephony Service for IMS
RTP Real-time Transport Protocol
RTCP Real-time Transport Control Protocol
RTCP_APP Real-time Transport Control Protocol-APPlication definition according to
SDP Session Description Protocol
SIP Session Initiated Protocol
SSRC Synchronization SouRCe
UE User Equipment

DETAILED DESCRIPTION

The present invention describes ways to overcome these problems which will allow a system-level interoperability between legacy terminals supporting AMR-WB based MTSI and new terminals deploying MTSI based on a new though bitstream interoperable codec. In particular, the present invention defines a solution for codec type signaling and usage, which is fully compatible with existing deployments of AMR-WB while still enabling full use of the capabilities of any new bit stream embedded speech codec in 3GPP.

To further explain the benefits of the present invention, a detailed description of prior art will follow below.

During a normal or prior art session negotiation procedure for a service, the codec choice for a session is done during control plane signalling, typically SIP and SDP. Hence, it is of vital importance that a new codec which has a backward compatible mode of operation can re-use already existing and deployed session negotiation mechanisms. If not, bit stream interoperability with the existing codec will be of no use since the session negotiation will fail when no matching codec type or codec configuration is found.

One or more embodiments herein disclose a two step approach to re-use existing signalling schemes for session negotiation using SIP/SDP and the signalling fields available in the AMR-WB payload format. The first step is to set up the session in SIP/SDP as a standard AWR-WB session, possibly with a limited codec mode set depending on the degree of backward compatibility (i.e. all modes or just a few selected modes). Subsequently, an indication about a new codec is introduced within payload packets to enable a receiving client node to identify and utilize the possibility of a new codec type without necessitating a new session negotiation procedure.

Since the description of the exemplary embodiments of the present invention depends on features available in the AMR-WB payload format, a short description of that payload format is shown below and with reference to the RTP packet in FIG. 1. The payload format is the same for both AMR and AMR-WB. For more details, see [1]

The first 12 bytes of the RTP packet is the generic RTP header, the AMR specific payload header includes the CMR bits, the F bit, the FT bits, and the Q bit. The AMR data is denoted d(0) ... d(243) in this particular case. The P bits at the end are padding bits. Note that this packet is an example where there is one AMR packet in the payload encoded with the 12.2 kbps mode. Further, the bandwidth efficient version of the payload format is used, another option is to use the octet-aligned version in which some additional padding bits are in the payload format header. The fields F, FT and Q are grouped together into one entity called Table of Contents (ToC). This is transmitted once per speech frame in the packet. The CMR field is only transmitted once in each RTP packet no matter how many speech frames that are present in the packet. The AMR unique signaling bits in the payload header are the following.

CMR—Codec mode requests, encodes the senders' mode request to the receiver of this packet to use when encoding and transmitting in the other direction. The encoding of the mode request is done according to the frame types described further below.

F—Indicates whether another speech frame follows the frame, which the current ToC describes.

FT—Frame type. Identifies what codec mode that was used to encode the current frame. The encoding of the frame type is done according to the frame types described further below.

Q—Frame quality indicator. Identifies if the frame is error-free or not. Not that if the speech data is transported end-to-end using IP, all speech frames delivered will be error free.

Related to this embodiment, the important fields of the RTP packet are the CMR and FT fields. Both of these fields encodes a table found in the AMR [2] and AMR-WB [3] specifications, see Table 1 and Table 2 below.

TABLE 1

AMR frame types

| Frame Type | Mode Indication | Mode Request | Frame content (AMR mode, comfort noise, or other) |
|---|---|---|---|
| 0 | 0 | 0 | AMR 4.75 kbit/s |
| 1 | 1 | 1 | AMR 5.15 kbit/s |
| 2 | 2 | 2 | AMR 5.90 kbit/s |
| 3 | 3 | 3 | AMR 6.70 kbit/s (PDC-EFR) |
| 4 | 4 | 4 | AMR 7.40 kbit/s (TDMA-EFR) |
| 5 | 5 | 5 | AMR 7.95 kbit/s |
| 6 | 6 | 6 | AMR 10.2 kbit/s |
| 7 | 7 | 7 | AMR 12.2 kbit/s (GSM-EFR) |
| 8 | — | — | AMR SID |
| 9 | — | — | GSM-EFR SID |
| 10 | — | — | TDMA-EFR SID |
| 11 | — | — | PDC-EFR SID |
| 12-14 | — | — | For future use |
| 15 | — | — | No Data (No transmission/No reception) |

TABLE 2

AMR-WB frame types

| Frame Type Index | Mode Indication | Mode Request | Frame content (AMR-WB mode, comfort noise, or other) |
|---|---|---|---|
| 0 | 0 | 0 | AMR-WB 6.60 kbit/s |
| 1 | 1 | 1 | AMR-WB 8.85 kbit/s |

TABLE 2-continued

AMR-WB frame types

| Frame Type Index | Mode Indication | Mode Request | Frame content (AMR-WB mode, comfort noise, or other) |
|---|---|---|---|
| 2 | 2 | 2 | AMR-WB 12.65 kbit/s |
| 3 | 3 | 3 | AMR-WB 14.25 kbit/s |
| 4 | 4 | 4 | AMR-WB 15.85 kbit/s |
| 5 | 5 | 5 | AMR-WB 18.25 kbit/s |
| 6 | 6 | 6 | AMR-WB 19.85 kbit/s |
| 7 | 7 | 7 | AMR-WB 23.05 kbit/s |
| 8 | 8 | 8 | AMR-WB 23.85 kbit/s |
| 9 | — | — | AMR-WB SID (Comfort Noise Frame) |
| 10-13 | — | — | For future use |
| 14 | — | — | speech lost |
| 15 | — | — | No Data (No transmission/No reception) |

Note that there are frame types for both AMR and AMR-WB available, which are reserved for future use; frame type index 12 through 14 for AMR and 10 through 13 for AMR-WB.

With reference to FIG. 2 a basic embodiment of a method according to the present invention discloses a method of improved session negotiation between a first and a second client in a cellular telecommunication system. The two clients negotiate S10 and agree upon a first codec type for a session, and subsequently initiate the session and exchange S20 media data frames according to the negotiated first codec type. During an ongoing exchange of media data frames in the initiated session, at least one of the first and second clients provide S30 an indication for a second codec type in at least one subsequent media data frame. Finally, upon receiving and recognizing the provided indication, the other of the first and second clients switch S40 to the indicated second codec type in a next media data frame, thereby enabling the two clients to exchange subsequent media frames utilizing the second codec type.

The client includes the status type indicator in a number of consecutive speech or media data frames until either a predetermined number of indicators have been sent, or until a corresponding indicator is received. If the predetermined number of indicators have been sent without the client receiving a corresponding indicator, the client stops sending the indicator and maintains transmission using the initially negotiated codec type. According to a preferred embodiment of the present invention, a client responds to a received status indicator by immediately switching to the requested codec type in a subsequent data frame. However, it is equally possible to respond to a received codec type indicator by sending at least one corresponding codec type indicator and subsequently switching to the requested codec type.

Thereby, no new session negotiation is required and both new and legacy codec implemented devices can communicate provided that the initially exchanged media data frames are bitstream backward compatible.

An important element of the disclosed embodiments of the present invention described here is to combine the traditional session control protocol signaling e.g. SIP/SDP when negotiating a session for media configuration, with the possibility to signal and request codec modes/types in the CMR field in the payload header. By using these two mechanisms together, it is possible to negotiate the usage of the new speech coder without jeopardizing interworking with legacy AMR-WB clients on the signalling level. The session negotiation is therefore done in three steps.

Firstly, using SIP/SDP, a "normal" AMR-WB session is negotiated in which no signaling is done indicating the usage of the new speech codec type. Secondly, when the media starts to flow between client A and client B (and vice versa), clients supporting the new speech codec type would send a codec mode request (CMR) using one of the reserved encodings in the AMR-WB frame type table. This would be repeated for the first N frames to ensure proper detection. The number N is configurable from 1 to 00, the reason for a limited number is to avoid confusion if CMRs with other values are sent. Finally, as soon as each client receives a CMR, which indicates support of the new codec type, it can start to use codec modes of the new codec and be sure that the other client can decode it.

The major benefit with this "layered" signaling of codec usage is that it enables deployment of a new speech codec without jeopardizing any previous deployment and do not require any updates on the signaling plane.

The invention is based on the re-use of existing ways of negotiating AMR-WB sessions.

TABLE 3

SDP example of AMR-WB negotiation.
SDP offer m=audio 49152 RTP/AVP 97 98
a=rtpmap:97 AMR-WB/16000/1
a=fmtp:97 mode-change-capability=2; max-red=220
a=rtpmap:98 AMR-WB/16000/1
a=fmtp:98 mode-change-capability=2; max-red=220; octet-align=1
a=ptime:20
a=maxptime:240

Table 3 shows an example of a typical AMR-WB negotiation in IMS Multimedia Telephony. Two different versions of AMR-WB are offered, one using the bandwidth efficient payload format (preferred) and one using the octet aligned payload format. The RTP clock rate is set at 16 kHz and one audio channel will be used.

The session negotiation for the new speech codec according to the present invention would look the same if backward compatibility were in place for all AMR-WB modes. If there were a limited backward compatibility for certain mode(s) only, a mode set restriction would be signalled. The SDP would then change; the example shown indicates support only for mode set 1, 2.

TABLE 4

SDP example of AMR-WB negotiation with limited mode support.
SDP offer m=audio 49152 RTP/AVP 97 98
a=rtpmap:97 AMR-WB/16000/1
a=fmtp:97 mode-set=1,2; mode-change-capability=2; max-red=220
a=rtpmap:98 AMR-WB/16000/1
a=fmtp:98 mode-set=1,2; mode-change-capability=2; max-red=220; octet-align=1
a=ptime:20
a=maxptime:240

This kind of SDP usage would set-up a session between any two clients that support AMR-WB and it would not indicate any support for a new speech codec.

The second phase of the negotiation procedure according to embodiments of the present invention would make use of a free frame type index in Table 2. In this example, frame type 12 has been used to indicate support for a new speech codec, however also other frame types can be used. Since this part of the session negotiation is done in-band in the media flow, a specific probing period is set, in which a negotiation is possible. If no joint exchange of CMR bits indicating a new speech mode has taken place inside the probing period, the second phase of the negotiation is assumed to have failed and the session will be treated as a standard AMR-WB session.

Figure 3:
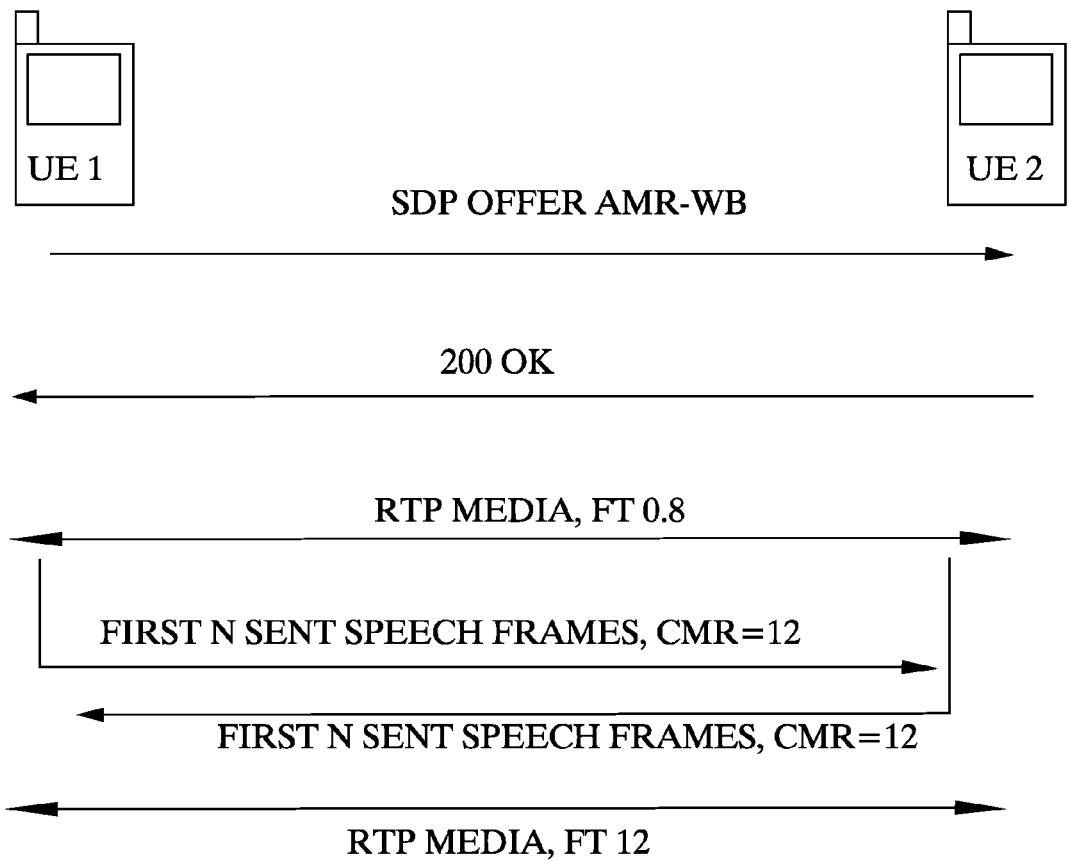
FIG. 3 illustrates the signaling of a further embodiment of the present invention.
Figure 4:
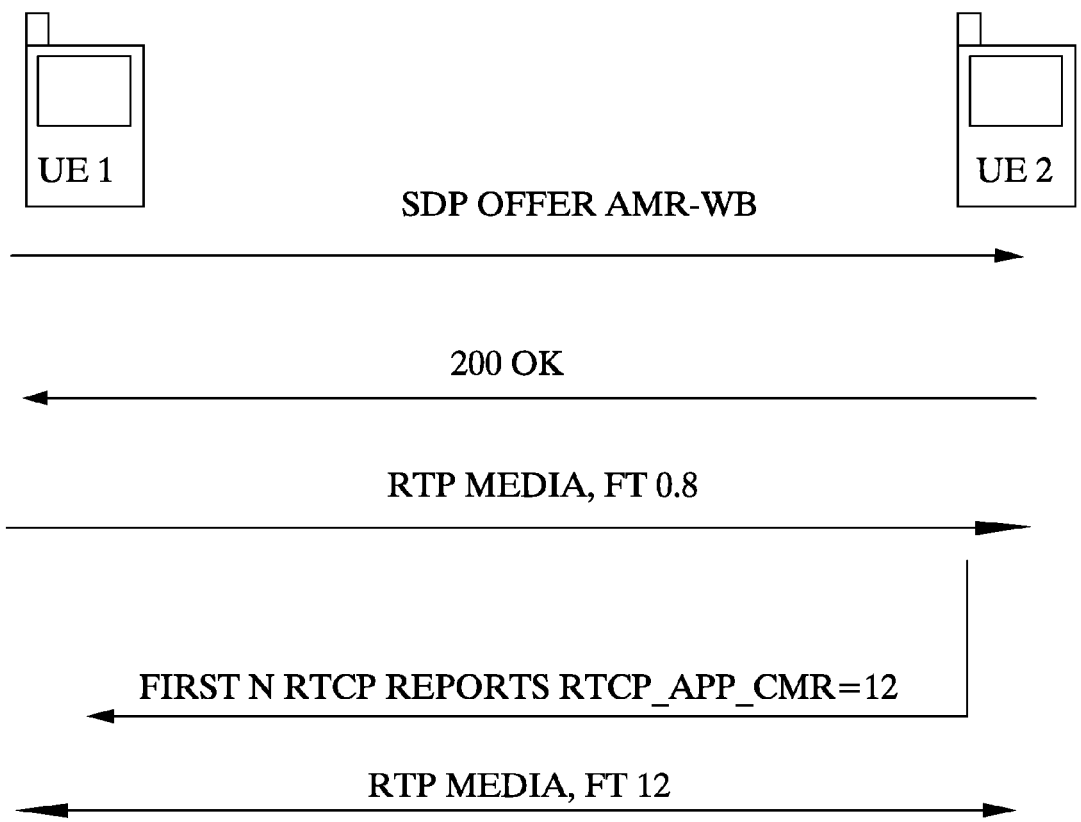
FIG. 4 illustrates a packet format.

Note that in the exemplary signaling scheme shown in FIG. 3, a full duplex session is assumed where both clients transmit speech data thereby automatically creating a signalling channel for the in-band CMR bits. However, in the case of a half duplex flow (see FIG. 4), where media only flows in one direction, this is not possible. In those cases, other means of conveying the CMR bits needs to be used for a successful two-phase negotiation. Although there are different ways to realize this, there is one which is directly compatible with the MTSI service in 3GPP [4] and therefore shown here. In the example signaling a first client UE1 transmits a conventional SDP OFFER AMR-WB to a second client UE2, which responds with 200 OK and thus accepts the suggested codec type. Subsequently, the session is initiated and media data frames are exchanged between the two clients RTP MEDIA, FT 0.8. The first client then includes an indication for a second codec type in N consecutive media data frames by including CMR=12. Upon receiving and recognizing the codec type indication, the second user equipment UE2 responds with N media data frames including CMR=12. Finally, the two clients can start exchanging media data using the now agreed upon second codec type, without initiating an entirely new session negation procedure.

Figure 5:
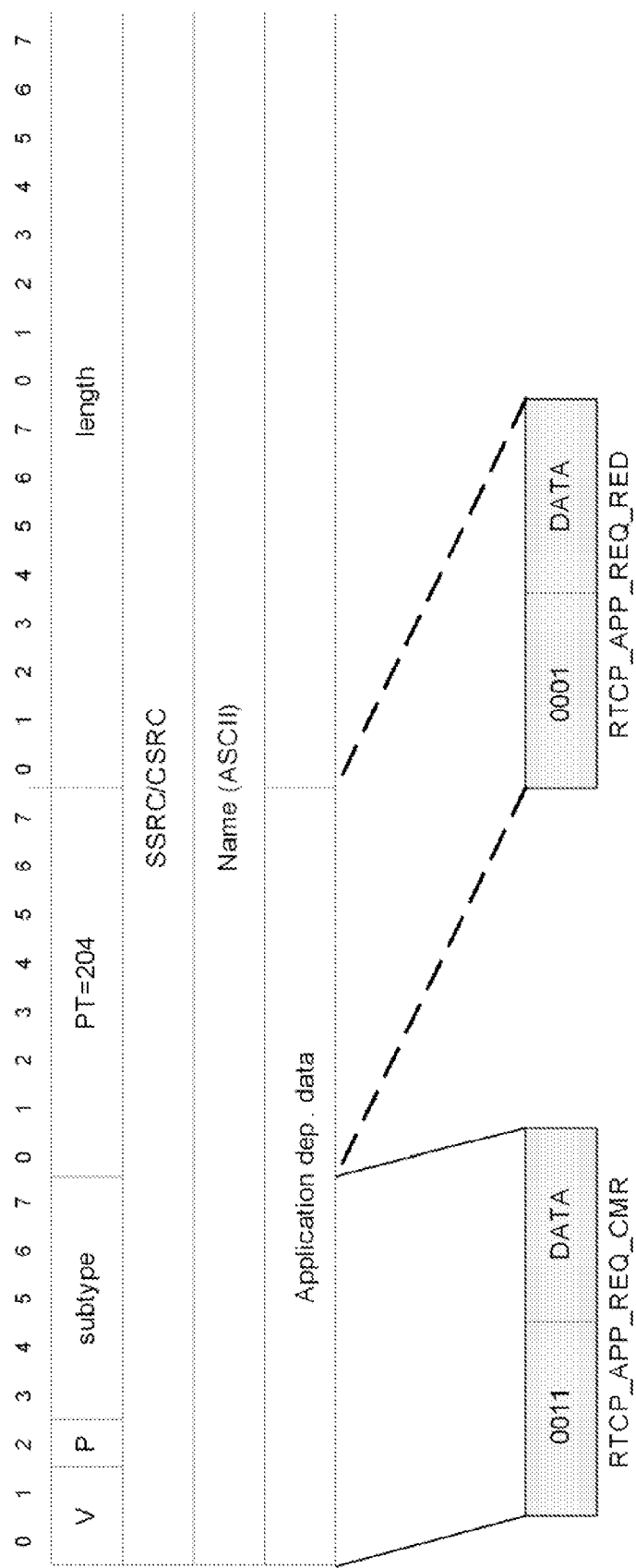
FIG. 5 illustrates a flow chart for an embodiment of a method according to the present invention.

An alternate solution for the CMR based negotiation is to use RTCP-APP to convey the CMR bits. An additional benefit with this mechanism is that it also works for half-duplex sessions; see FIG. 4 and FIG. 5. MTSI has defined a specific APP report for conveying adaptation parameters to be used during the session when speech data is flowing. The procedure is basically the same as the one described with reference to FIG. 5, with a few exceptions. Since a half-duplex session still will send RTCP reports in the opposite direction of the media flow, this opens up a possibility for this signalling to take place. Note that the RTCP-APP encoding for the CMR requests are identical to the in-band version so the same behaviour can be seen. There is one difference in the rate of CMR requests sent using RTCP, which is the limitation, set by the RTCP transmission rules. However, the biggest consequence of this limitation is a slightly prolonged set-up time for the second phase of the negotiation, the success rate will at the end be the same.

Figure 6:
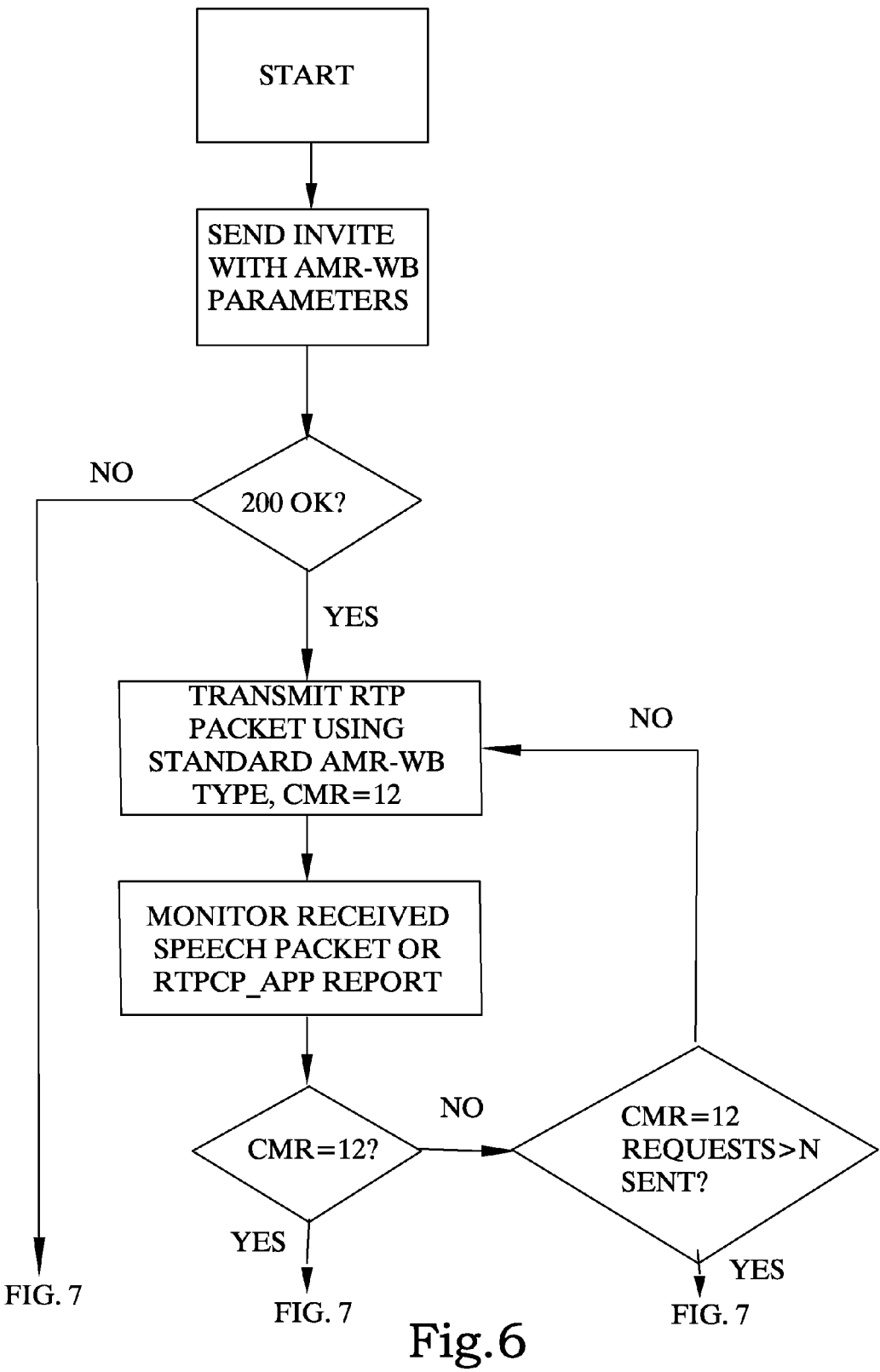
FIG. 6 illustrates a flow chart for a further embodiment of a method according to the present invention.
Figure 7:
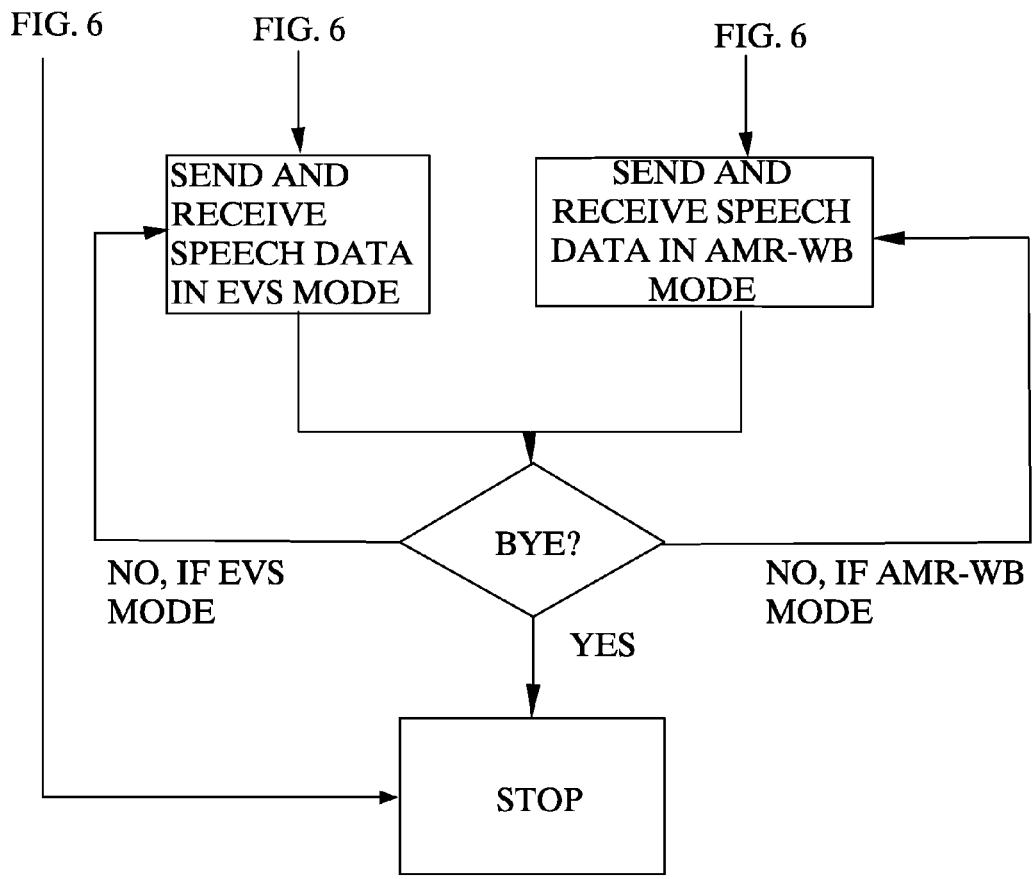
FIG. 7 is a continuation of the flow chart of FIG. 6

With reference to FIG. 6 and FIG. 7, a specific embodiment of a method according to the present invention will be described. In this example, CMR=12 equals the placeholder for the new codec and the parameter N is configurable (A value in the order of 10 is likely to be used). The extension to AMR-WB, i.e. the new backward compatible speech codec, is called EVS. Note that the CMR value can be any value currently available in the AMR-WB frame type index.

Although the specific embodiment uses AMR-WB and EVS are examples of a first and second codec type, it is evident that the same method can be utilized for other combinations of speech codec types as well.

Initially a client or user equipment transmits a session negotiation signal with an invitation including a first codec type, in this case AMR-WB. If the client then receives a positive response (200 ok) to the invitation, it continues with starting a media frame transmission/exchange using the negotiated codec type. In up to N consecutive data frames the client includes CMR=12 to indicate that it is capable of using a second codec type. At the same time, the client monitors received speech packets and/or RTPCP-APP report for corresponding indications. Upon receiving a corresponding indication, the client starts to transmit data frames according to the second codec type e.g. EVS mode. If no such indication is provided, the client maintains the previously negotiated codec type e.g. AMR-WB mode Note that the flow in FIG. 6 and FIG. 7 is an example, the start of EVS negotiation can be done at any time during the session, not necessarily immediately after the 200 OK has been received. Further, the test "CMR=12?" does not have to be exactly this test. There are alternative ways to do this, e.g.

1) The remote client (the client receiving the CMR request for EVS) could immediately start using the EVS frame types (FT=12 or 13 or something else). This will then also declare that it is EVS capable and it does not need to send "CMR=12" to indicate that.

2) One could also define that "FT=12" is the "question/invite for EVS capability" and "FT=13" is the acknowledgement.

Figure 8:
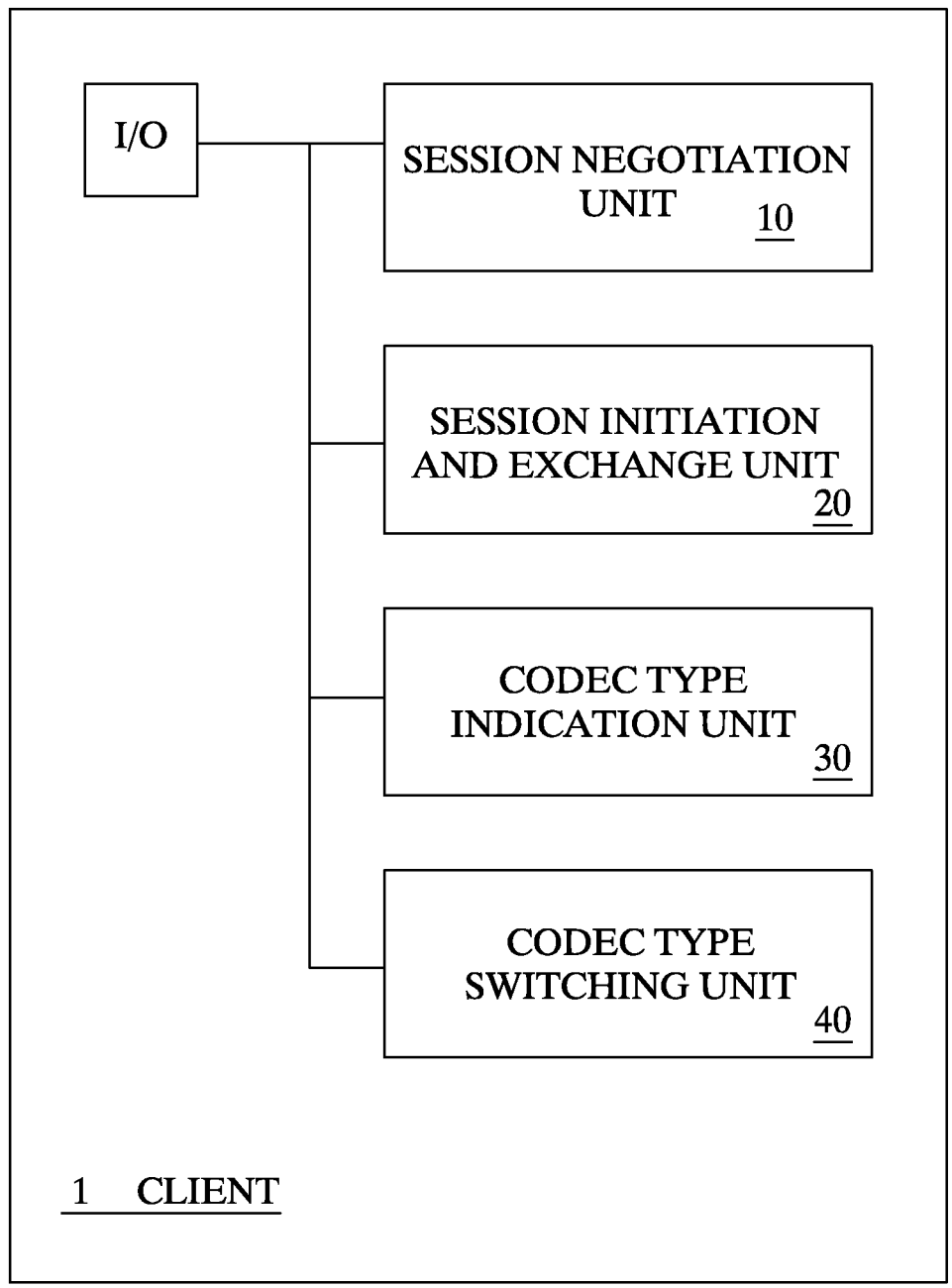
FIG. 8 illustrates a user equipment according to an embodiment of the present invention.

With reference to FIG. 8, an embodiment of a user equipment or client according to the present invention will be described. One particular aspect about the user equipment or client is that it needs to be capable of recognizing and acting upon receiving an indication about a requested new or second codec type. To this effect the user equipment includes a generic input/output unit I/O for enabling receiving and transmitting signals, and a negotiating unit for negotiating 10 and agreeing upon a first codec type for a session with another client, and a session unit for initiating the session and exchanging 20 media data frames with another user equipment according to the negotiated first codec type. Further, the client includes a codec switch unit for, during the initiated session, providing 30 an indication for a second codec type in at least one subsequent media data frame. Finally, a unit for, upon receiving and recognizing a corresponding indication, switching 40 to the indicated second codec type in a next media data frame, thereby enabling the first and second clients to exchange subsequent media frames utilizing the second codec type. Thus, the user equipment or client is adapted to not only provide a codec switch indication, but to recognize and respond to receiving a corresponding indication. The above-described units are typically enabled by means of one or more hardware processors or software algorithms configured to perform the steps of the disclosed embodiments of methods of this disclosure. In addition, the functionality of the above described client or user equipment can be implemented in a node in a telecommunication system.

A prerequisite for the disclosed method and arrangement is that the data packet e.g. RTP packet, comprises a bitstream embedded backward compatible codec format. Although the present invention is described in the context of a packet switched system, it would be equally applicable to a circuit switched system.

Advantages of the present invention include:

The benefit of using the two-phase approach for session negotiation according to the embodiments of the present invention is because of the backward compatibility expressed on the SIP/SDP signaling plane. It looks like an ordinary AMR-WB session but the CMR signaling "probes" for the possibility to use the new speech codec instead. The nature of the CMR bits makes this backward compatible since a legacy decoder will automatically dismiss a CMR request or a received frame with a "new" FT, if it does not understand it.

REFERENCES

[1] IETF RFC 4867
[2] 3GPP TS 26.101, "Adaptive Multi-Rate (AMR) speech codec frame structure"
[3] 3GPP TS 26.201, "Adaptive Multi-Rate-Wideband (AMR-WB) speech codec; Frame structure"
[4] 3GPP TS 26.114, "IP Multimedia Subsystem (IMS); Multimedia telephony; Media handling and interaction"

The invention claimed is:

1. A method implemented by a first client node for session negotiation with a second client node in a cellular telecommunication system, wherein the method comprises:
   negotiating and agreeing upon a first codec type for a session with the second client node, wherein said negotiating comprises transmitting capability information to the second client node indicating one or more codec types that the first client node supports and receiving capability information from the second client node indicating one or more codec types that the second client node supports;
   initiating said session and exchanging media data frames according to said first codec type;
   during said session, including in at least one subsequent media data frame to be sent to the second client node an indication that indicates the first client node supports a second codec type, wherein the at least one subsequent media data frame is sent to the second client node subsequent to the media data frames exchanged according to the first codec type; and
   upon receiving and recognizing a corresponding indication that indicates the second client node supports the second codec type, switching from exchanging media data frames in said session according to said first codec type to exchanging media data frames in said session according to said indicated second codec type.

2. The method according to claim 1, wherein said including comprises including said indication in a predetermined number of subsequent media data frames to be consecutively sent to the second client node.

3. The method according to claim 1, wherein said session comprises a full duplex session, and wherein said switching is performed upon recognizing said corresponding indication in at least one subsequent media data frame received from the second client node.

4. The method according to claim 1, wherein said session is a half duplex session, and wherein said switching is performed upon recognizing said corresponding indication in at least one subsequent signaling control data frame received from the second client node.

5. The method according to claim 4, wherein said including comprises including said indication in a payload header of said at least one subsequent media data frame, and wherein said switching is performed upon recognizing said corresponding indication in a payload header of said at least one subsequent signaling control data frame.

6. The method according to claim 1, wherein said including comprises including said indication in a payload header of said at least one subsequent media data frame.

7. The method according to claim 6, wherein said including comprises including said indication in a codec type request of said at least one subsequent media data frame.

8. The method according to claim 1, wherein said switching is performed upon receiving and recognizing a subsequent media data frame that has been encoded by the second client device according to the second codec type.

9. The method according to claim 1, wherein media data frames exchanged with the second client node are contained within a Real-Time Transport Packet (RTP) packet.

10. The method according to claim 1, wherein said transmitting comprises transmitting capability information to the second client node that does not indicate the first client node supports the second codec type, despite the first client node in fact supporting the second codec type.

11. A first client node in a cellular telecommunication system, comprising one or more processors configured to implement:
    a negotiating circuit configured to negotiate and agree upon a first codec type for a session with a second client node, wherein the negotiating circuit is configured to transmit capability information to the second client node indicating which one or more codec types the first client node supports and receive capability information from the second client node indicating which one or more codec types the second client node supports;
    a session circuit configured to initiate said session and exchange media data frames according to said first codec type;
    a codec switch circuit configured, during said session, to include in at least one subsequent media data frame to be sent to the second client node an indication that indicates the first client node supports a second codec type, wherein the at least one subsequent media data frame is sent to the second client node subsequent to the media data frames exchanged according to the first codec type; and
    wherein the codec switch circuit is configured, upon receiving and recognizing a corresponding indication that indicates the second client node supports the second codec type, to switch from exchanging media data frames in said session according to said first codec type to exchanging media data frames in said session according to said indicated second codec type.

12. The client node according to claim 11, wherein the codec switch circuit is configured to include said indication in a predetermined number of subsequent media data frames to be consecutively sent to the second client node.

13. The client node according to claim 11, wherein said codec switch circuit is configured to switch to exchanging media data frames in said session according to said indicated second codec type immediately upon receiving and recognizing said corresponding indication.

14. The client node according to claim 11, wherein said codec switch circuit is configured to switch to exchanging media data frames in said session according to said indicated second codec type after receiving and recognizing a predetermined number of said corresponding indications.

15. The first client node according to claim 11, wherein the negotiating circuit is configured to transmit capability information to the second client node that does not indicate the first client node supports the second codec type, despite the first client node in fact supporting the second codec type.

16. A method implemented by a first client node for session negotiation with a second client node in a cellular telecommunication system, wherein the method comprises:
    negotiating and agreeing upon a first codec type for a session with the second client node, wherein said negotiating comprises transmitting capability information to the second client node indicating which one or more codec types the first client node supports and receiving capability information from the second client node indicating which one or more codec types the second client node supports;

initiating said session and exchanging media data frames according to said first codec type;

during said session, receiving and recognizing in at least one subsequent media data frame an indication that indicates the second client node supports a second codec type, wherein the at least one subsequent media data frame is received from the first client node subsequent to the media data frames exchanged according to the first codec type; and upon receiving and recognizing of said indication, switching from exchanging media data frames in said session according to said first codec type to exchanging media data frames in said session according to said indicated second codec type.

17. The method according to claim 16, further comprising, before said switching, including in at least one subsequent media data frame to be sent to the second client node a corresponding indication that indicates the first client node supports the second codec type.

18. The method according to claim 17, wherein said switching comprises switching upon receiving and recognizing a predetermined number of subsequent media data frames that include said indication.

19. The method according to claim 16, wherein said transmitting comprises transmitting capability information to the second client node that does not indicate the first client node supports the second codec type, despite the first client node in fact supporting the second codec type.

* * * * *

UNITED STATES PATENT AND TRADEMARK OFFICE
CERTIFICATE OF CORRECTION

PATENT NO.       : 9,161,286 B2
APPLICATION NO.  : 13/263094
DATED            : October 13, 2015
INVENTOR(S)      : Enström et al.

Page 1 of 1

It is certified that error appears in the above-identified patent and that said Letters Patent is hereby corrected as shown below:

Specification

In Column 3, Line 17, delete "3d" and insert -- 3rd --, therefor.

In Column 6, Line 9, delete "00," and insert -- ∞, --, therefor.

Signed and Sealed this
Fifth Day of April, 2016

Michelle K. Lee
*Director of the United States Patent and Trademark Office*